United States Patent [19]

Bauer

[11] Patent Number: 4,510,120
[45] Date of Patent: Apr. 9, 1985

[54] MIXING HEAD

[75] Inventor: Adolf Bauer, Olching, Fed. Rep. of Germany

[73] Assignee: Krauss-Maffei Aktiengesellschaft, Munich, Fed. Rep. of Germany

[21] Appl. No.: 426,102

[22] Filed: Sep. 28, 1982

[30] Foreign Application Priority Data

Nov. 12, 1981 [DE] Fed. Rep. of Germany ....... 3144920

[51] Int. Cl.³ .......................... B01F 5/04; B01F 15/02; B01J 14/00
[52] U.S. Cl. .................................... 422/133; 366/137; 366/159; 366/173; 366/174; 422/134; 422/135; 422/224
[58] Field of Search ............... 422/133, 134, 135, 224, 422/242; 366/137, 159, 173, 174; 137/625.4, 625.48, 896; 257/63; 264/DIG. 83; 261/DIG. 26; 282/359 E

[56] References Cited

U.S. PATENT DOCUMENTS

| 3,788,337 | 1/1974 | Breer | 422/133 X |
| 3,883,121 | 5/1975 | Guillard | 366/173 |
| 4,115,299 | 9/1978 | Mühle | 422/133 X |
| 4,330,086 | 5/1983 | Nysted | 261/DIG. 26 X |
| 4,378,335 | 3/1983 | Boden et al. | 422/111 X |
| 4,379,122 | 4/1983 | Taubenmann | 422/133 |

FOREIGN PATENT DOCUMENTS

| 2023862 | 12/1971 | Fed. Rep. of Germany | 366/173 |
| 2612812 | 2/1980 | Fed. Rep. of Germany | |
| 2925173 | 1/1981 | Fed. Rep. of Germany | |
| 2403178 | 4/1979 | France | |
| 576331 | 6/1976 | Switzerland | |
| 2015888A | 9/1979 | United Kingdom | |
| 2017514 | 10/1979 | United Kingdom | 137/896 |

Primary Examiner—Barry S. Richman
Assistant Examiner—William R. Johnson
Attorney, Agent, or Firm—Schwartz, Jeffery, Schwaab, Mack, Blumenthal & Koch

[57] ABSTRACT

A mixing head for two reactive components, e.g. the components of a settable synthetic resin mixture, comprises a mixing chamber in which a plunger is shiftable to block and unblock the nozzle orifices and drive the reaction mixture from the chamber through an outlet. At least one of the nozzles is carried on a readily shifting slider which cooperates with a similarly shiftable obturating member to define a small premixing chamber, as desired, and deflect the mixture through at least 90° within the mixing chamber. This system is especially effective for the mixing of reactive components which have hitherto been found to be difficult to mix with conventional mixing heads.

12 Claims, 5 Drawing Figures

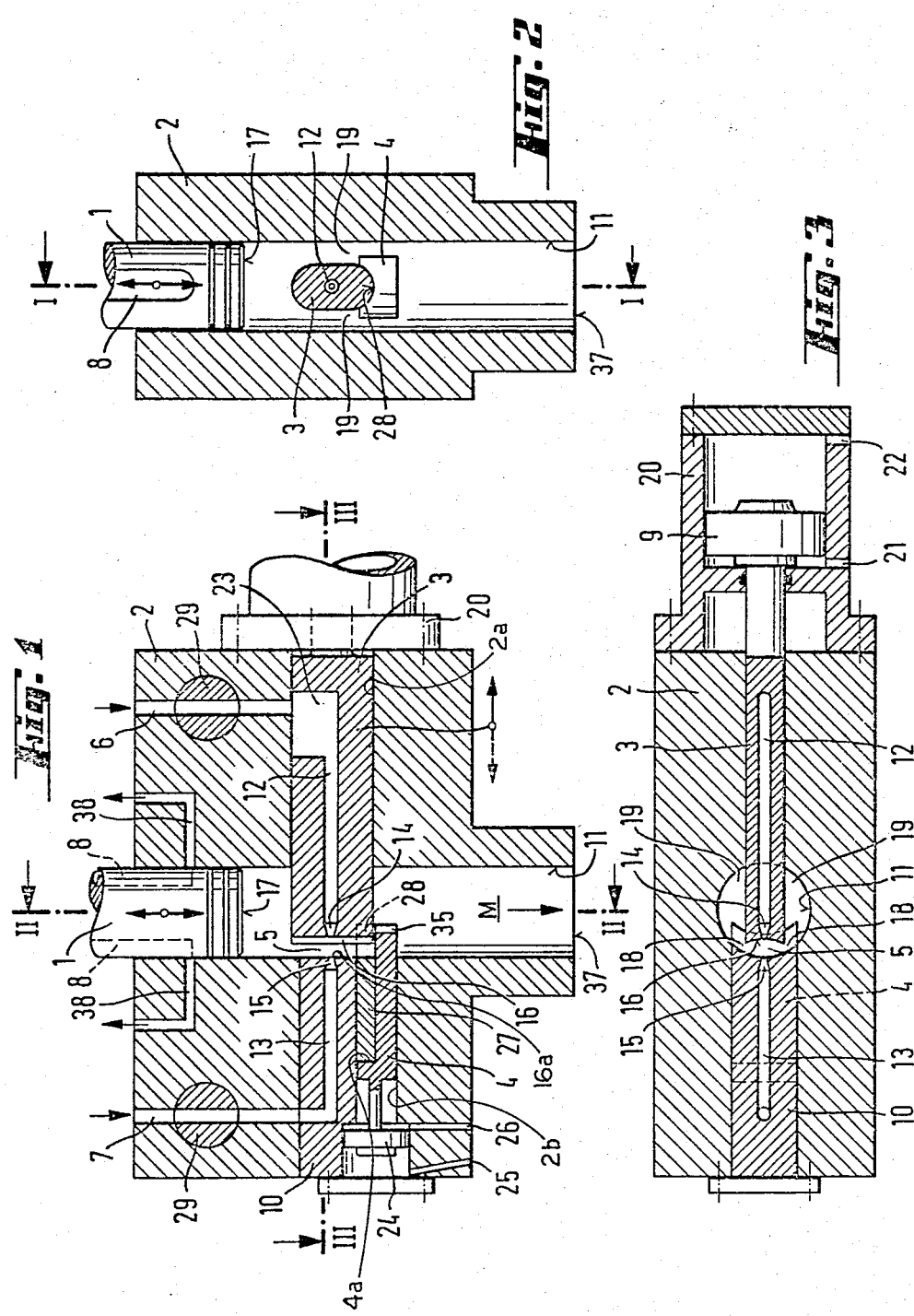

MIXING HEAD

CROSS REFERENCE TO RELATED APPLICATIONS

This application is related to the commonly assigned copending application Ser. No. 229,945 filed Jan. 30, 1981, (now U.S. Pat. No. 4,379,122 of Apr. 5, 1983) and, in connection with other related matter, reference may be had to U.S. Pat. Nos. 3,706,515, 3,975,128, 4,167,236, 4,211,345 and 4,226,543 as well as to the patents and publications cited or referenced therein.

FIELD OF THE INVENTION

The present invention relates to a mixing head and, more particularly, to a mixing head for reactive materials and specifically the reactive components of a two or more part synthetic resin composition.

BACKGROUND OF THE INVENTION

As may be deduced from the above-identified copending application and the U.S. patents mentioned above, as well as from the references specifically made of record below, mixing heads have been utilized heretofore for the intensive mixing of two or more reactive components which, like a polyol and di-isocyanate or polyisocyanate, are capable of reaction to form a settable synthetic resin composition such as a polyurethane. Such mixing heads may open into a space in which the reacting components are to be received in the form of the reacting mixture, e.g. a mold.

Such heads can be provided with inlets, nozzles or orifices through which the respective components can be fed to the mixing chamber of the head, the mixing chamber having an outlet turned toward the mold or other cavity adapted to receive the reacting mixture.

Thus, for example, German Pat. No. 20 97 935 discloses a device or mixing head for the mixing of two or more interreactive synthetic resin components, each of which is introduced through a respective inlet nozzle into the mixing chamber, the jets being trained upon one another to promote the intimate mixing. The mixture emerges from an outlet of the mixing chamber and the latter is so formed that a longitudinally shiftable control piston or plunger can be displaced from one end position in which the nozzles are unblocked and mixing as well as discharge of the mixture are permitted, into another end position in which the nozzles are blocked and the mixture within the chamber is expelled by the plunger into the mold.

To prevent fluid components in the various passages from stagnating, the control plunger can be provided with bypass passages which can bypass the flow of the respective component from the nozzle to return passages in a recirculating system provided with a pump or the like.

To control the backpressure within the mixing chamber as seen by the incoming stream of each component, it has been proposed to introduce into the mixing chamber a body which partially obstructs, constructs or occupies a portion of the flow cross-section or volume. (See the aforementioned copending application and German Pat. No. 20 65 841 and German printed application No. 26 12 812).

It is also known, in this connection, to conduct the mixture into a calming or quiescence chamber prior to its passage into the mold, the calming chamber or quiescence chamber lying at a right angle to the mixing chamber as described in German Pat. No. 23 27 269 or German open application No. 29 07 938, for example.

While all of the various improvements on the basic system have been effective to various degress in assuring effective mixing of two or more components for the purposes described, the problem has not been solved completely heretofore, especially for components which are less radially miscible with one another and which do not, as readily, form miscible mixtures. There is a desire to use such less miscible components, however, because they generally are less expensive than the more readily miscible substances.

OBJECTS OF THE INVENTION

It is, therefore, the principal object of the present invention to provide an improved mixing head for two or more reactive components which is capable of intimately mixing even the less miscible reactive components which have been found to be problematical heretofore and thereby permit, with a comparatively low cost mixing head, lower cost reactive components to be used in producing settable synthetic resin mixtures.

A more specific object of the invention is to provide a more versatile mixing head than has been proposed or utilized heretofore and especially one which is capable of effectively combining various types of reactive components with one another under a variety of mixing conditions. A corollary of this object is the desire to provide an improved ability to adjust the mixing head for these varying conditions.

Still another object of the invention is to provide a low cost, compact and highly controllable mixing head for the reasons and purposes described.

SUMMARY OF THE INVENTION

These objects and others which will become apparent hereinafter are attained in accordance with the invention, in a mixing head having the basic elements previously described, i.e. a mixing chamber having an outlet opening into a mold or other place into which the mixture of reactive components is to be fed, at least one pair of juxtaposed nozzles opening into the chamber for delivery of respective jets of respective reactive components to said chamber so that the jets impinge upon each other and contribute to the mixing of these components within the chamber, and a control plunger shiftable from a position in which the nozzles are unblocked into a position in which the flow from the nozzles into the chamber is blocked and the mixture is displaced from the chamber by the plunger.

According to the invention, this mixing head is formed with a nozzle body provided with at least one of the nozzles and shiftable into and out of the chamber, preferably perpendicularly to the axis of this chamber and to the axis of the plunger and to its direction of displacement.

With the system of the invention, therefore, the body which is introduced to a selective degree into the chamber to partly obstruct the cross-section thereof is the same body which carries at least one of the nozzles so that by the movement of this body, the nozzle carried thereby can be moved proximately to the other or opposing nozzle and cross-section phenomena as well as nozzle spacing parameters can be readily adjusted to suit the desired mixing conditions.

This body can be a slide in which the movable nozzle is mounted and the nozzle orifice can be fixed on this slide.

This system permits an optimum selection of the nozzle spacing and optimal adjustment of the space in which the mixture initially forms to achieve results which could not be achieved heretofore even when chamber-filling or obstructing bodies were selectively introduced into the mixing chamber.

According to another feature of the invention, the mixing chamber is constricted or reduced in volume by the introduction of this body to a predetermined degree into the mixing chamber and this body is thereafter withdrawn.

For example, in many cases it has been found that a more effective mixing is obtained in a more confined space, and this is readily achieved with the system of the present invention utilizing the nozzle carrying body when the latter is introduced into the mixing chamber to a significant degree, preferably concurrently with adjustment of the rest position of the control plunger. This, of course, permits the slidable body and the plunger to vary the volume to suit the desired mixing conditions. A larger volume is provided when, for example, the plunger and the sliding body are retracted, in which case the sliding body can be drawn back until its end face is flush with the chamber wall.

It is found to be advantageous, moreover, to provide a device with an additional member forming a filler body or backpressure-increasing body, this backpressure body also being shiftable from a position where it lies flush with the wall laterally into the chamber.

Preferably, the backpressure body lies directly adjacent but downstream of the movable nozzle body, the backpressure body and the movable nozzle body subdividing the mixing chamber into two parts, namely a premixing chamber and a main chamber.

This is particulary the case when the end face of the nozzle body has a concave formation of circular arc (cylindrical) profile which is turned toward the other nozzle so that this concavity will form the premixing chamber whose bottom outlet side is closed by the backpressure body.

This arrangement also has the advantage that the flow of the component mixture is caused to deflect angularly through at least 90° and even up to 180° in passing from the premixing chamber into the mixing chamber, thereby introducing a quiescence or calming of the originally turbulent mixture within the mixing head and without connecting the mixing chamber thereof to a quiescent chamber at right angles therewith. This deflection can be reinforced when the backpressure body is formed with a concavity extending radially of the mixing chamber but open in the direction opposite the outlet, i.e. toward the plunger while the nozzle body has convex formations complementary to and formfitting in the backpressure body.

The single mixing head thus combines mixing, backpressure control and direction-change control in an extremely simple structure, especially when the backpressure body is wider than the nozzle carrying body.

It is also found to be advantageous to form the nozzle body with the inlet of the respective nozzle orifice and to form one or both of the bodies with end faces which lie flush with the mixing chamber wall in the nonmixing phase when they are retracted to clear the control plunger.

This can apply to a second nozzle body carrying the opposite nozzle and likewise movable radially into and out of the chamber.

BRIEF DESCRIPTION OF THE DRAWING

The above and other objects, features and advantages of the present invention will become more readily apparent from the following description, reference being made to the accompanying drawing in which:

FIG. 1 is an axial cross-sectional view, taken generally along the lines I—I of FIG. 2 through a mixing head according to the invention and with the parts thereof shown in their positions corresponding to the mixing phase;

FIG. 2 is a section taken along the line II—II of FIG. 1;

FIG. 3 is a section taken along the line III—III of FIG. 1;

SPECIFIC DESCRIPTION

Figure 4:
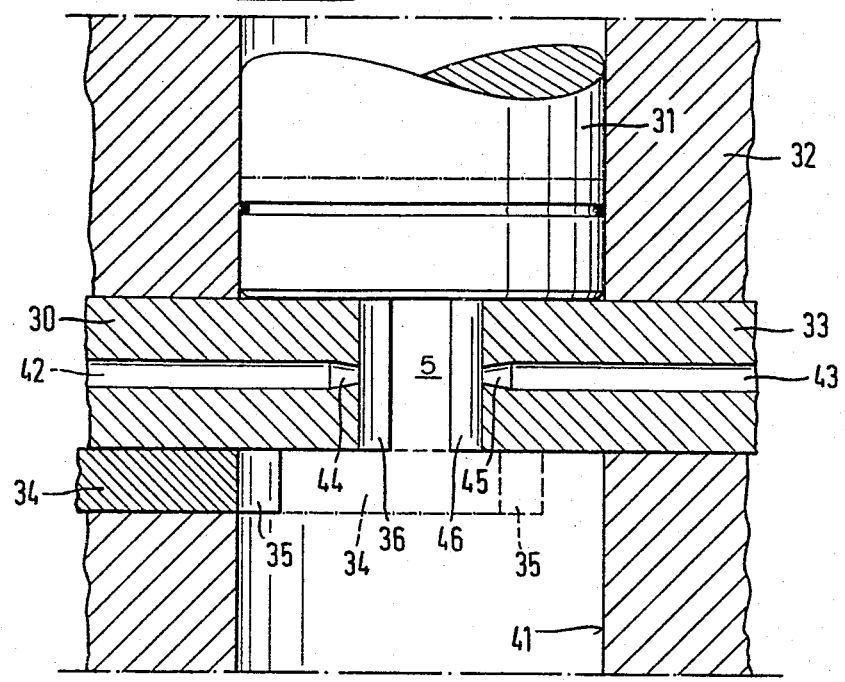
FIG. 4 is a partial section illustrating another embodiment of the invention with two shiftable nozzles bodies and a blocking slide in a mixing position.

In the embodiment of FIGS. 1 through 3 a housing 2 of the mixing head is shown to be provided with a cylindrical bore 11 in which a control plunger or piston 1 is slidable and can be displaced by a piston and cylinder arrangement, e.g. as described in the aforementioned copending application.

The housing 2 is also formed with a pair of radially extending passages 2a and 2b, the former slidably receiving a nozzle body 3 while the latter slidably receives a closure body or slider 4 which also serves as a backpressure body when it partially fills the mixing chamber M formed by the bore 11 between the end 17 of the plunger 1 and an outlet 37 which opens into a mold.

Figure 5:
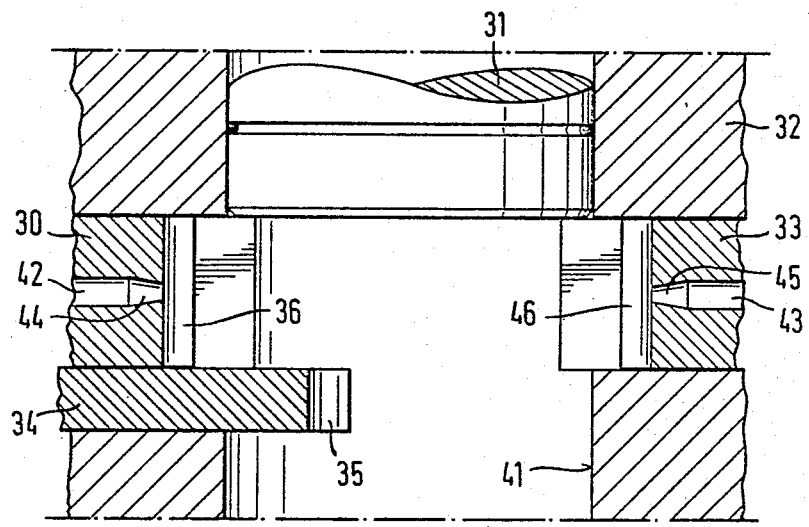
FIG. 5 is a view similar to FIG. 4 but showing the parts of the apparatus in another mixing position.

The radial passage 2b also contains a fixed insert 10 which is not radially slidable but which can be, if desired, as is the case with the nozzle bodies of FIGS. 4 and 5.

In FIGS. 1 and 2, the control plunger 1 is shown in its upper position in which it clears the mixing chamber M and permits two synthetic resin components to be vigorously mixed within this chamber.

To this end, the head 2 is formed with passages 6 and 7, through which the reactive components are respectively admitted. These components are delivered by passages 12 and 13 to respective nozzle orifices 14 and 15 which are trained upon one another so that two liquid jets impinge upon one another in a premixing chamber 5 defined by the ends of the bodies 3 and 10, respectively, but closed at its bottom by the shoulder 4 as shown in FIG. 1 so that the mixture must pass upwardly or laterally before passing downwardly to the outlet 37. This ensures an angular deflection of the mixture through at least 90° and generally through more than 90° and up to 180°.

The premixing chamber at its upper end is bounded by the free end 17 of the plunger 1 so that this plunger can control the volume of the premixing chamber, e.g. to increase the volume by projection upward from its position shown in FIG. 1 or to decrease the volume of the premixing chamber by attaching the surface 17 to the top of the slot 3.

The two components are introduced at high pressure into the premixing chamber and specifically at a pressure of 40 to 200 bar so that mixing occurs at especially high velocities.

The mixture is discharged from the premixing chamber partly laterally through passages 18 between the end face 16 of the nozzle slider 3 and the wall of board 11 and partly upwardly.

The upwardly directed flow of the mixture impinges against the end face 17 of the plunger 1 and is deflected downwardly to pass around the flanks of the slider 3 through passages 19 or similarly around the flanks of the slider 4 toward the outlet. Because of this deflection of the turbulent mixture and its flow into the larger cross section of the mixing chamber M below the body 4, a calming turbulent stream occurs. The backpressure is determined by the degree to which the sliders 3 and 4 obstruct the flow cross section.

The position of the slider 3 determines the width of the premixing chamber 5 which advantageously is formed between concave surfaces, namely the concave end faces 16 and 16a of the slider 3 and member 10, respectively.

The position of the slider 3 is controlled by a piston 9 receivable in a cylinder housing 20 and hydraulically or pneumatically energized via the bores 21, 22 which can shift the slider 3 into its mixing phase (FIG. 1) or retract the slider 3 into its nonmixing position in which the end face 16 lies flush with the end of bore 11 to clear the plunger 1.

When the mixing phase is completed, therefore, both bodies 3 and 4 are retracted so that their arcuate end faces 16 and 35 lie flush with the wall of bore 11 whereby the plunger 1 is advanced to drive the mixture from the chamber M through the outlet 37 and bring the end face 17 flush with the plane of the outlet 37.

When the plunger 1 is shifted into a nonmixing position, the orifices 14 and 15 of the nozzles are initially blocked briefly and then connected via passages 8 with outlets 38 for the respective components in the plunger 1 whereby the components can be recirculated.

To allow the radial movement of body 3 while maintaining fluid communication between the passages 6 and 11, an elongated chamber 23 is provided in the slider 3. Naturally, when another slider is provided for the nozzle 15, a similar communication is required.

While the drive for the control plunger 1 has not been shown in any detail, it can correspond to that of German Pat. No. 20 07 935 which also describes the recirculation of the components in the nonmixing phase.

In the embodiment of FIGS. 1 and 2, the insert 10 forms part of a housing for the slider 4 and its control cylinder which receives a piston 24 coupled with the slider 4 and supplied with pressure medium via the passages 25 and 26.

Slider 4 is provided on its upper side with a semi-cylindrical recess 28 which opens upwardly and receives the complementary convex semi-cylindrical bottom of the slider 3. The semi-cylindrical surfaces on the upper and lower sides of the slider 3 have been found to facilitate or streamline flow of the mixture therearound. A plate 27, also of semi-cylindrical cross section is received in the recess 28 and forms a guide for the slider 4. This plate is removably and replaceably mounted in the head 2 and forms an adjustable stop engageable with a shoulder 4a admitting the displacement of the slider to the right (FIG. 1) into the mixing chamber M.

Each of the passages 6 and 7 can be provided with a rotary valve 29 in the vent these passages should be closed off, e.g. for the brief periods in which the apparatus is switched over from its mixing to its nonmixing phase and vice versa.

FIGS. 4 and 5 show another embodiment of the invention which is generally similar to that of FIGS. 1 through 3. The other mixing head 32 has a control plunger 31 which is axially displaceable in bore 41 forming the mixing chamber.

In this embodiment, however, two radially shiftable nozzle sliders 30 and 33 are provided with respective passages 42 and 43 for the respective components and outlet orifices or nozzles 44 and 45.

The closure of obturating slider 34, whose end face 35 is cylindrical with the same radius of curvature as the wall 41 to enable it to lie flush with this wall, is radially shiftable into and out of the chamber below the bodies 30 and 33. A similar slider can be provided on the right hand side as well, if desired.

The end faces 36 and 46 of the nozzle sliders 30 and 33 also are cylindrial with the same curvature as that of the wall of the bore 41 and can lie flush with the latter in the retracted states of these sliders.

As can be seen from FIG. 4, the space between the end faces and the position of these end faces with respect to the obturating slider 34 can vary widely. For example, when the nozzle sliders are brought close together (FIG. 4) and the slider 34 is shifted into its broken line position, an extremely small premixing chamber can be formed which can be blocked from the top by the end face of the plunger 31. The volume of the mixing chamber can be increased by retracting this plunger 31 to its dot-dash position and deflection of the mixture can be eliminated by retracting the slider 34 into the slide line position shown. Alternatively, the ends of the nozzle bodies can be widely spaced (FIG. 5) and the slider 34 can penetrate into the mixing chamber to a greater or lesser extent to simply act as a backpressure-increasing body.

A wide variety of positions and orientations of the sliders is thus possible, thereby permitting the system to compensate for various characteristics of the components to be mixed and to provide optimum mixing conditions even for components which have hitherto been considered difficult to mix.

I claim:

1. A mixing head for at least two reactive components comprising:
    a housing formed with a bore defining a mixing chamber and having an outlet for discharge of a reaction mixture;
    a control plunger displaceable in said bore from a position wherein said plunger is retracted from said outlet into a position wherein said plunger is proximal to said outlet thereby driving a reaction mixture from said mixing chamber out of said outlet;
    at least two nozzles which form a pair of nozzles in said housing juxtaposed with one another in a direction along the path of said plunger for impinging streams of respective interreactive components against one another to form said reaction mixture;
    a nozzle body carrying one of said nozzles and shiftable transversely of the direction of displacement of said plunger into said chamber toward the other of said nozzles; and means for advancing said body into said chamber into said path of said plunger and retracting said body from said chamber out of said path.

2. The mixing head defined in claim 1 wherein said nozzle body is a slider shiftable within said housing in a direction perpendicular to said bore, said one of said nozzles including means defining an orifice located within said slider.

3. The mixing head defined in claim 2 wherein said slider is shiftable into said mixing chamber to a predetermined degree to reduce the volume of mixing and is retractable from said mixing chamber.

4. The mixing head defined in claim 2 further comprising means defining an obturating member shiftable in said housing and located directly adjacent said slider and between said slider and said outlet, wherein said means provides for the shifting movement of said member within said housing in a direction perpendicular to said bore and further where said obturating member defines with an end of said slider a premixing chamber in which said impinging streams initially meet.

5. The mixing head defined in claim 4 wherein said slider includes means defining a passage communicating with the respective nozzle orifice.

6. The mixing head defined in claim 4 wherein said plunger is adjustable, while in a retracted position, in a manner so as to vary the volume of said premixing chamber within said bore.

7. The mixing head defined in claim 4 wherein said obturating member is wider than said slider.

8. The mixing head defined in claim 4 wherein the ends of each said slider and said obturating member which face the mixing chamber have a curvature corresponding to that of the wall of said bore and lie flush with said bore when fully retracted to clear said plunger.

9. The mixing head defined in claim 8 wherein said obturating member and said slider are shiftable into said chamber from diametrically opposite directions.

10. The mixing head defined in claim 9 wherein said obturating member is formed with an upwardly open elongated concavity and said slider is formed with a convexity along its underside complementary to and slidably engaged in said concavity.

11. A mixing head for at least two reactive components comprising:
a housing formed with a bore defining a mixing chamber and having an outlet for discharge of a reaction mixture;
a control plunger displaceable in said bore from a position wherein said plunger is retracted from said outlet into a position wherein said plunger is proximal to said outlet thereby driving a reaction mixture from said mixing chamber out of said outlet;
at least two nozzles which form a pair of nozzles in said housing juxtaposed with one another for impinging streams of respective interreactive components against one another to form said reaction mixture;
a nozzle body carrying one of said nozzles and shiftable transversely of the direction of displacement of said plunger into said chamber toward the other of said nozzles;
means for advancing said body into said chamber and retracting said body from said chamber, said body being a slider shiftable in said housing perpendicular to said direction to the axis of said bore, said one of said nozzles including means defining an orifice located within said slider; and
means defining an obturating member shiftable in said housing and located directly adjacent said slider and between said slider and said outlet wherein said means provides for the shifting movement of said member within said housing in a direction perpendicular to said bore and further where, said obturating member defines with an end of said slider a premixing chamber in which said impinging streams initially meet, the ends of each said slider and said member which face the mixing chamber having a curvature corresponding to that of the wall of said bore and lying flush with said bore when fully retracted to clear said plunger, said member and said slider being shiftable into said chamber from diametrically opposite directions, said member being formed with an upwardly open elongated concavity and said slider being formed with a convexity along its underside complementary to and slidably engaged in said concavity.

12. A mixing head for at least two reactive components comprising:
a housing formed with a bore defining a mixing chamber and having an outlet for discharge of a reaction mixture;
a control plunger displaceable in said bore from a position wherein said plunger is retracted from said outlet into an advanced position wherein said plunger is proximal to said outlet thereby driving a reaction mixture from said mixing chamber out of said outlet, said plunger being formed with a pair of component recirculation passages;
at least a pair of nozzles in said housing juxtaposed with one another in a direction along the path of said plunger for impinging streams of respective interreactive components against one another to form said reaction mixture;
a nozzle body carrying one of said nozzles and shiftable transversely of the direction of displacement of said plunger into said chamber toward the other of said nozzles; and
means for advancing said body into said chamber into said path of said plunger and retracting said body from said chamber out of said path so that said passages register with said nozzles in said advanced position of said plunger.

* * * * *